United States Patent
Pallmann

(10) Patent No.: US 7,467,585 B2
(45) Date of Patent: Dec. 23, 2008

(54) APPARATUS FOR CONVERTING FREE-FLOWING FEED MATERIAL INTO GRANULES, AGGLOMERATES, PELLETS, COMPACTS, AND THE LIKE

(75) Inventor: Hartmut Pallmann, Zweibruecken (DE)

(73) Assignee: Pallmann Maschinenfabrik GmbH & Co. KG, Zweibruecken (DE)

( * ) Notice: Subject to any disclaimer, the term of this patent is extended or adjusted under 35 U.S.C. 154(b) by 0 days.

(21) Appl. No.: 11/453,999

(22) Filed: Jun. 16, 2006

(65) Prior Publication Data
US 2006/0283340 A1    Dec. 21, 2006

(30) Foreign Application Priority Data
Jun. 16, 2005   (DE) .................. 10 2005 027 861

(51) Int. Cl.
*B30B 3/00*   (2006.01)
*B29C 47/52*  (2006.01)
(52) U.S. Cl. .................. 100/145; 100/117; 425/331; 425/382 R; 425/DIG. 230
(58) Field of Classification Search .................. 100/104, 100/110, 117, 126, 145, 150, 903, 905, 907; 425/311, 382 R, DIG. 230; 241/220
See application file for complete search history.

(56) References Cited

U.S. PATENT DOCUMENTS

| 5,009,586 A | 4/1991 | Pallmann |
| 6,551,090 B2 * | 4/2003 | Pallmann ................ 425/382 R |
| 2004/0250899 A1 * | 12/2004 | Pallmann .................. 144/218 |

FOREIGN PATENT DOCUMENTS

| DE | 32 10 974 A1 | 10/1983 |
| DE | 38 42 072 C1 | 12/1989 |

* cited by examiner

*Primary Examiner*—Jimmy T Nguyen
(74) *Attorney, Agent, or Firm*—Muncy, Geissler, Olds & Lowe, PLLC

(57) ABSTRACT

The invention is directed to a device for converting free-flowing feed material by pressurization with a cylindrical compression chamber arranged around an axis and confined at its periphery by a ring element with passage openings, and accommodating a pressure element that rotates around the axis in the direction of rotation. The feed material is axially conveyed to the compression chamber and is radially supplied to the ring element by the pressure element. The pressure element includes at least one pressing blade, which extends to and interacts with the ring element, the front flank of said pressing blade in the direction of rotation being curved such that between pressure arm and ring element, a narrowing compression zone is formed, the end of which is formed by a pressure piece.

22 Claims, 5 Drawing Sheets

APPARATUS FOR CONVERTING FREE-FLOWING FEED MATERIAL INTO GRANULES, AGGLOMERATES, PELLETS, COMPACTS, AND THE LIKE

This nonprovisional application claims priority under 35 U.S.C. § 119(a) on German Patent Application No. DE 102005027861, which was filed in Germany on Jun. 16, 2005, and which is herein incorporated by reference.

BACKGROUND OF THE INVENTION

1. Field of the Invention

The present invention relates to an apparatus for converting free-flowing feed material into granules, agglomerates, pellets, compacts, and the like, as well as a shape component inside such an apparatus.

2. Description of the Background Art

It is generally known to convert, by compressing and heating, inorganic matter, which most often is thermoplastic synthetic material, frequently waste material to be recycled, into free-flowing granules, which are then used as a source material to be fed to extruders, injection molding machines, blowing machines, and the like. In the course of the forced mixing and compression of the feed material, friction heat is generated as a result of the inner friction associated therewith, which leads to a softening of the thermoplastic material. If the feed material is heated to or beyond a melting point of the respective material, plasticization occurs, which makes it possible for agglomerates to form. Additives like saw dust and wood fibers, for example, can be mixed into the synthetic materials. The plasticized synthetic material then assumes the function of a binding agent for the additive, binding its particles. If, on the other hand, the temperatures remain below the material-specific melting point, the feed material is merely heavily compressed, and compacts are generated, in the form of pellets, for example.

Organic feedstock or a blend of organic and inorganic materials can also be processed in a similar fashion. In addition to the previously mentioned wood particles, paprika powder, sugar, sugarcane fiber, starch, and the like are also suitable.

The challenge with these methods, and in particular with the agglomeration, is to control the temperature development in a suitable device such that on the one hand, there is sufficient heat available to convert the thermoplastic synthetic particles into the plasticized condition, but on the other hand, to avoid temperatures that are too high, because they could otherwise result in thermal damage to the material. The exact and constant maintenance of the correct material-specific temperature is thus a pre-requisite for a high-quality end product.

A known apparatus for this purpose is described in DE 32 10 974 A1, wherein shredded plastic film, after being shredded and cleaned, is converted into granules. Essentially, the apparatus is comprised of a conical extruder, which terminates in a crack or narrow annular chamber. The feed material is thereby continuously compacted in the pressing screw, thereby squeezing out the cleaning water before it reaches its highest density in the crack or the annular chamber. Due to the existing pressure and friction forces amongst the particles, enough heat is generated to dry out the feed material completely while forming compacts. By increasing the pressure against a perforated plate arranged at the upper face end of the crack or the annular chamber, thus increasing the temperature to the melting point of the feed material, a sintering process is started, which results in agglomerates.

A noticeable disadvantage thereof is that it is very difficult to achieve the course of action of the apparatus within the necessarily narrow temperature range. Due to the fact that the input material is already subjected to considerable pressure and shear forces in the extruder, the feed material heats up at a very early stage inside the apparatus. As a result of heat accumulation during the passage through the apparatus, the maximum temperature is thus reached long before the passage through the perforated plate so that cooling measures are necessary. The great temperature fluctuations associated therewith result in granules of non-uniform physical and chemical consistency, which limits their subsequent processing.

In contrast thereto, DE 38 42 072 C1, which corresponds to U.S. Pat. No. 5,009,586 and is assigned to the assignee of the present invention, discloses an apparatus that is much improved and well-proven in the field. The agglomerator described therein is comprised of a screw conveyor with material infeed, which conveys the feed material axially into a disk-shaped annular compression chamber. At its periphery, the compression chamber is confined by a perforated die, through which the feed material is pressed by a rotating pressing blade after sufficient compacting and heating.

Due to the crescent shape of the pressing blade and in conjunction with the perforated die, a compression zone that is tapered toward the perforated die is formed, into which the plastic particles are drawn in the course of the rotation of the pressing blade and are subsequently subjected to increasing pressure forces. At the same time, the forced mixing of the feed material due to the rotating pressing blade generates substantial shear and friction forces, which altogether causes a quick self-heating in the compression chamber.

Simultaneously with the temperature increase, a softening of the plastic particles occurs, which in turn lowers their adhesive resistance when passing through the perforated die. Therefore, a further increase of the pressure and shear forces is no longer possible when this condition is reached, because due to the associated increase in temperature, the feed material counteracts these tendencies by reducing the viscosity. Thus, a balanced condition is created, the parameters of which, like pressure, temperature and viscosity, essentially depend on the kind of feed material and the geometrical configuration of the compression zone.

Due to the described construction design of known devices, a manipulation of the parameters listed above to adjust defined materials or to attain defined characteristics of the end product is not possible, although this would be desirable in view of a broadest-possible field of application for the devices.

SUMMARY OF THE INVENTION

It is therefore an object of the present invention to further develop these devices such that a defined control of the balanced condition, and thus of the above-named parameters, in dependence from the kind of feed material and the properties of the end product is provided.

The invention is based on the idea to make it possible to influence the parameters describing the balanced condition by retroactively changing the constructive and geometric configuration of the compression chamber, thus allowing an adjustment both to the type of feed material and the shape, size, and consistency of the desired end product.

According to the invention, the changeability of the compression zone is achieved by the exchangeability of the units that are primarily forming this zone. For this purpose, a removable and exchangeable shape component is inserted in the pressing blade.

It is a great benefit of the invention to be able to adjust an apparatus of the present invention to the feed material, or to different requirements for the end product, or to an optimizing of the end product in view of high product quality, without significant expenditures in time or equipment. Owing to the adjustability of the optimal process parameters, the operator of devices of the present invention is able to produce consistently high-quality granules, even with changeable starting conditions, with only one apparatus and without any significant additional financial outlay.

Because the shape component of the apparatus of the present invention is exposed to heavy mechanical stress due to the prevalent pressure and friction forces, it is consequently subjected to heavy wear, which results in an increasing deterioration of the performance of the equipment. In this context, it has proven to be particularly beneficial that worn shape components of the present invention can be quickly and easily replaced by new ones. The down times therefor are rather insignificant, and the material expenditure is very low as compared to conventional devices that require the replacement of an entire pressure element. It is thus possible to replace the shape components more frequently, thus consistently ensuring the optimal geometry of the compression zone with the benefit of a constantly high equipment performance with a consistently high-quality end product. In a further development of this idea, the use of a wear-resistant material for the shape component is particularly preferred.

Furthermore, it is beneficial for the shape component to be of a length that allows a flush and preferably steady course of an active flank of the pressure arm, even in the transition area to the pressure arm. This ensures a steady, jam-free material flow in the compression chamber.

By constructing the shape component with a long leg, which essentially forms the compression zone, and a short leg, which is anchored in the pressure arm, a secure mounting of the shape component in the pressure arm is achieved without negatively affecting its statics.

The mounting of the shape component to the pressure arm is beneficially achieved to a considerable degree by a formlocking connection. The formlocking connection ensures a maximal contact surface of the shape component in the pressure arm so that essentially, the shape component is exposed to pressure stress only. At the same time, a formlocking connection prevents the feed material from penetrating hollow cavities and recesses, which would require considerable cleaning expenditures.

The formlocking connection can be formed by beaded rims, which engage in suitably formed grooves. Thus, a centering of the shape component in its intended position as well as a securing in this position is achieved when the shape components are inserted in the pressure arm.

In addition, safeguards can be arranged, which make an axial displacement of the shape component against the pressure arm impossible. It is thus ensured that the shape component is always arranged in the plane of the pressure element.

In addition to the formlocking connection, the shape component can be fixedly attached in the pressure arm by a fastening screw. By arranging the fastening screw in the area of the contact surface with the pressure piece, the screw is covered by the pressure piece during operation of an apparatus of the present invention, and is thus protected. This allows instant access to the fastening screw after removal of the pressure piece without the danger of material deposits in this area.

In an embodiment of the invention, the shape component and the pressure piece can be connectable units or, preferably, a one-piece unit. The two parts can be assembled outside the apparatus without affecting the operation of the equipment so that it is possible to install both parts as one unit in a pressure arm. This cuts down the already short idle times of an apparatus of the invention even more when the shape components are replaced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
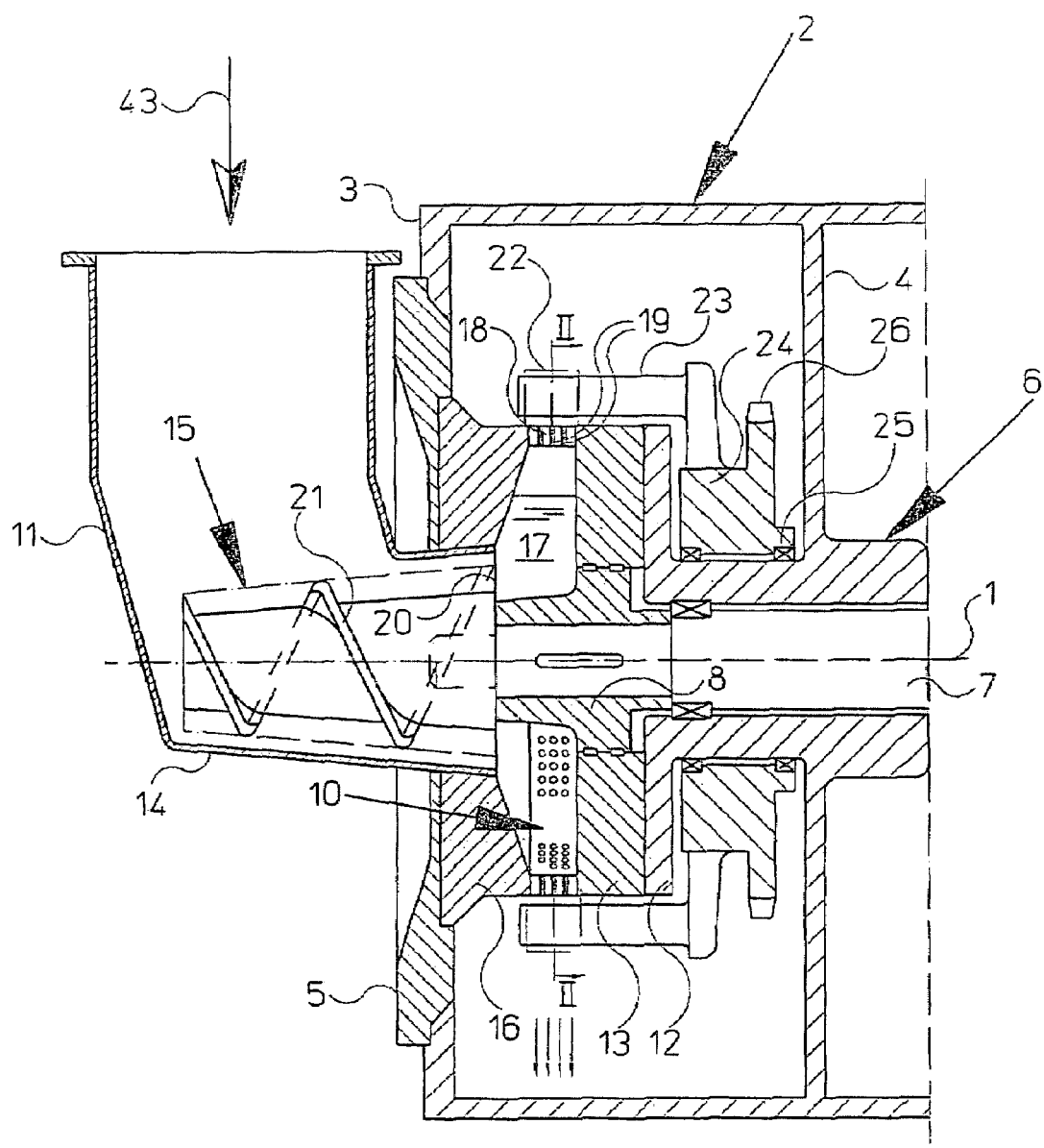
FIG. 1 is a vertical longitudinal section of an apparatus according to an embodiment of the present invention along line I-I illustrated in FIG. 2.
Figure 2:
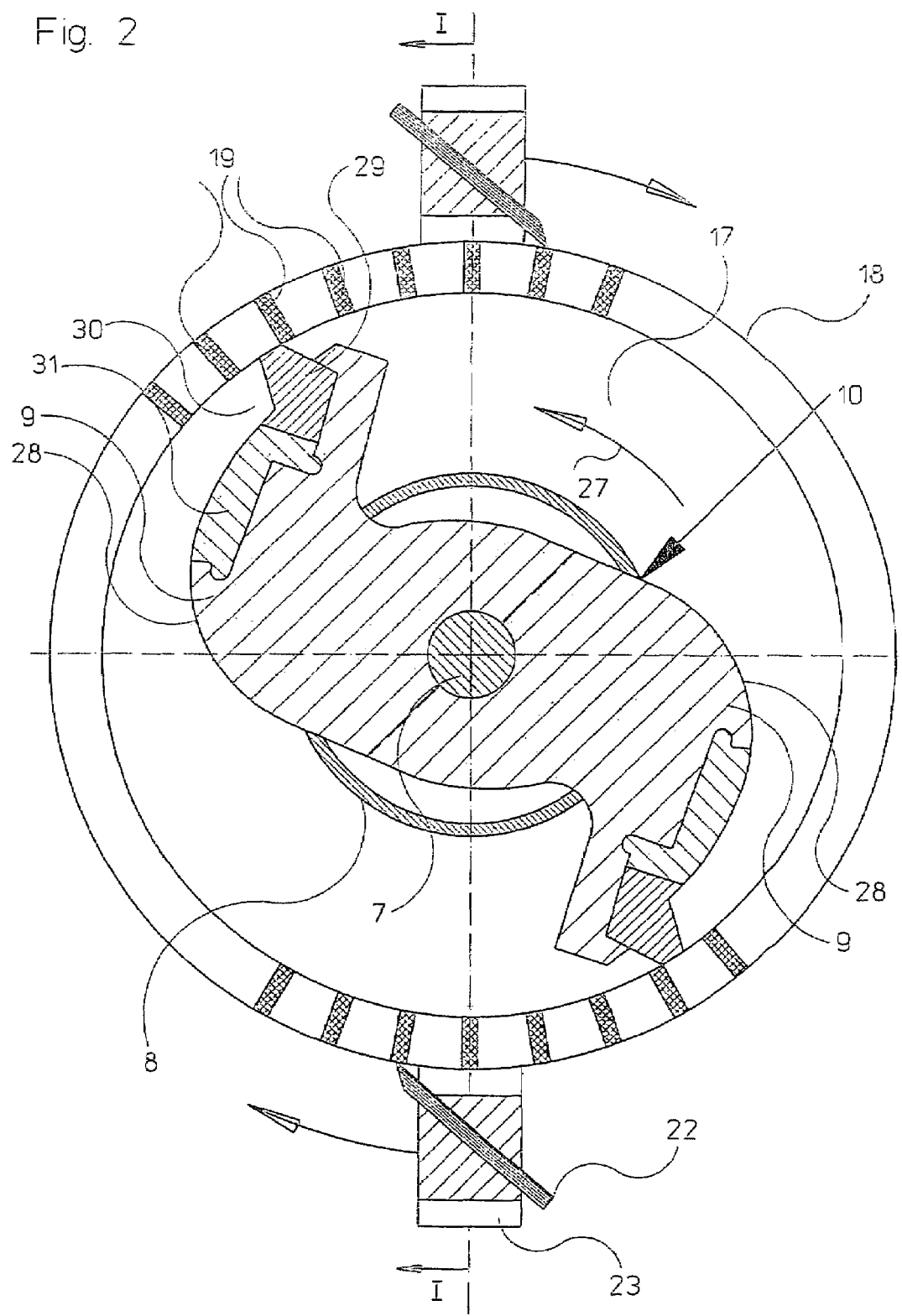
FIG. 2 is a vertical cross section of the apparatus illustrated in FIG. 1 along the line II-II.

FIGS. 1 and 2 provide an overview of an apparatus according to an embodiment of the present invention. Illustrated is a roughly drum-shaped housing 2 enclosing an axis of rotation 1, the upper faces of which are closed off by a front wall 3 and a rear wall 4. The front wall 3 has a central opening, which can be sealed with the aid of a pivotable housing door 5. In the area of the rotational axis 1, the rear wall 4 forms a horizontal bearing area 6 for the reception and feed-through of a drive shaft 7. The end of the drive shaft 7, which is located outside the housing 2, is not shown in detail and has a multi-groove disk, which is connected to an electric drive by belts.

On the end of the drive shaft 7 that is located inside the housing 2, a non-rotatable drive collar 8 having diametrically opposing, crescent-shaped pressure arms 9 (FIG. 2) is positioned. The drive collar 8 and the pressure arms 9 form a pressure element 10.

Inside the housing 2, the horizontal bearing area 6 for the drive shaft 7 expands, thus forming a coaxial annular flange 12, axially abutting to which is a likewise coaxial annular wall 13. With its inner periphery, the annular wall 13 forms a sliding connection to the drive collar 8.

In the area of the axis of rotation 1, the housing door 5 has an annular opening, through which an outer shell 14 of a coaxial conveyor screw 15 extends into the interior of the housing 2. Outside the housing 2, a vertical material intake 11 is connected to the outer shell 14. On the inside of housing door 5, a second annular wall 16 enclosing the outer shell 14, which is located at an axial distance opposite the annular wall 13, can be seen. The two annular walls 13 and 16 thus form a coaxial compression chamber 17 having the shape of an annular disk, which on its peripheral side is confined by a ring element 18 with radial passage openings 19, and which houses the rotating pressure element 10. Due to the diameter of the outer shell 14 being larger than the outer diameter of the drive collar 8, an annular gap is formed, through which the compression chamber 17 is supplied with feed material by the conveyor screw 15 and its screw spirals 21.

The annular element 18 is swept by two rotating knives 22, which are adjustably and exchangeably mounted to knife holders 23. The knife holders 23, in turn, are arranged on a knife-holder hub 24, which is supported in the horizontal bearing area 6 by bearings 25 and is provided with a sprocket wheel 26 for propulsion.

Figure 3:
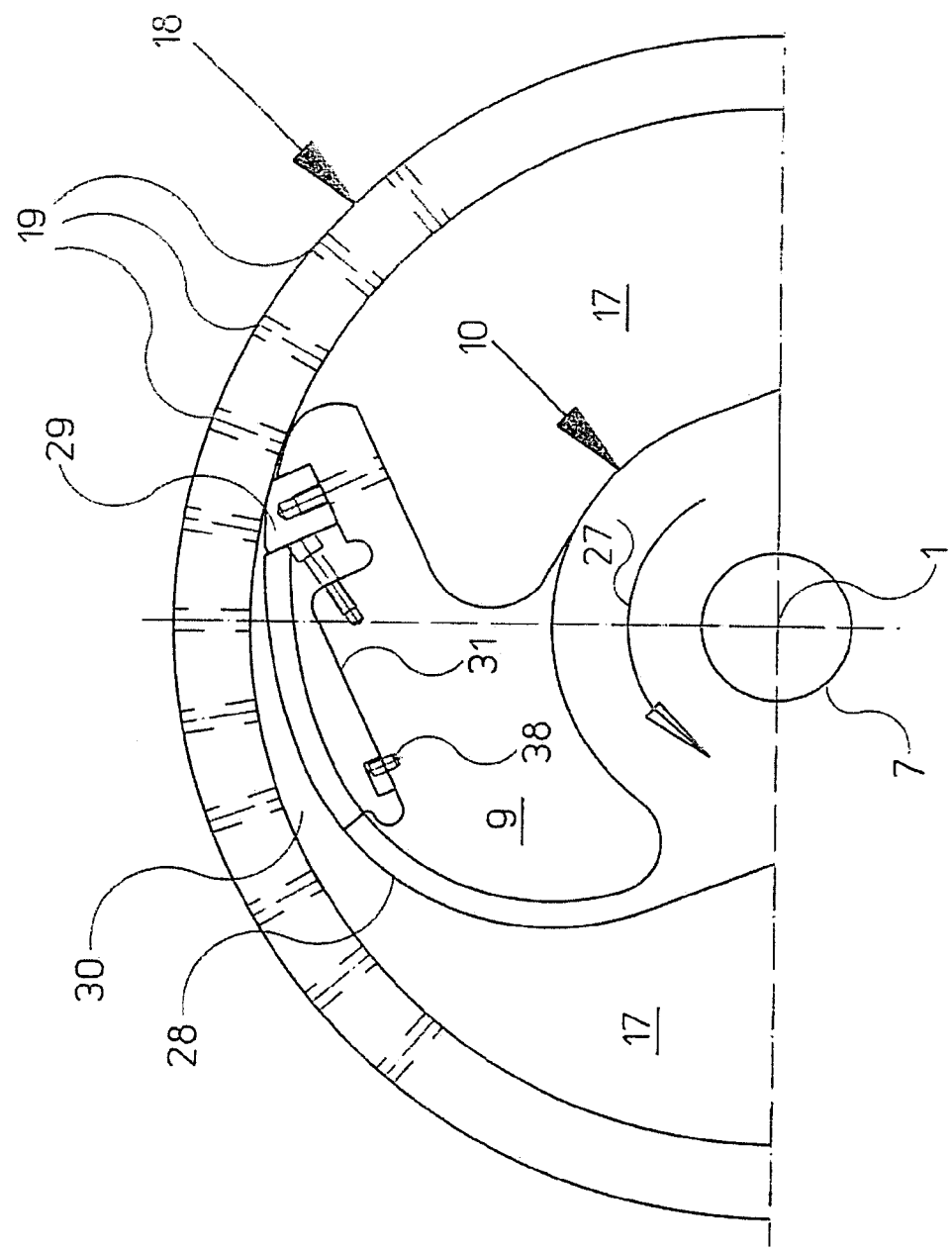
FIG. 3 is a detailed illustration of the cross section illustrated in FIG. 2 in the area of the compression zone.

In FIG. 3, the compression chamber 17 with its surrounding annular element 18 and the pressure element 10 rotating therein is illustrated at a larger scale. The direction of rotation of the pressure element 10 is indicated with reference numeral 27. From a top view, the pressure arm 9 of the pressure element 10 is crescent-shaped, whereby the outer end of the pressure arm 9 extends to the annular element 18.

For the conversion of the feed material, the front flank 28 of the pressure arm 9 in a rotational direction 27 is of primary importance. Toward the outer end of the pressure arm 9, the front flank curves in a direction that runs counter to the direction of rotation 27 with the result that the distance between annular element 18 and flank 28 steadily decreases. Thus, a gusset-shaped (triangular) compression zone 30, which tapers off in a direction that runs counter to the direction of rotation 27, is formed. The compression zone 30 is sealed by a pressure piece 29, which is inserted in a recess in pressure arm 9, and which can be mounted from the rear side thereof. The pressure piece 29 abuts slidingly to the interior face of the annular element 18.

Figure 4:
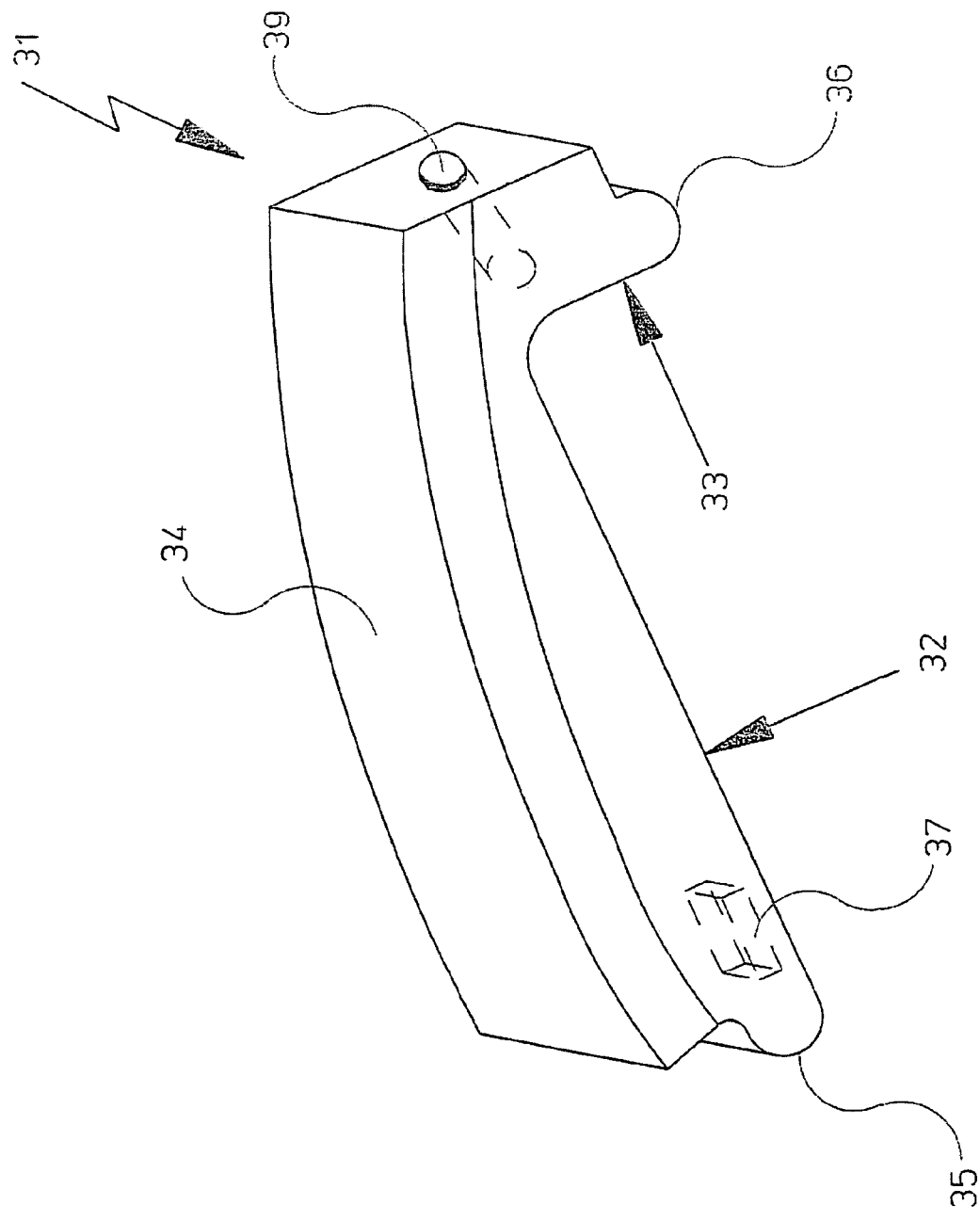
FIGS. 4 and 5 are views of two different embodiments of a shape component of the present invention.

The part of the pressure arm 9 that is located in front of the pressure piece 29 in the direction of rotation 27 is formed by a shape component 31, which is illustrated in more detail in a transverse view in FIG. 4. The shape component 31 is angle-shaped, having a long leg 32 and a short leg 33. The long leg 32 has a curved spine 34, which is part of the flank 28, thus significantly influencing the geometry of the compression zone 30. The free ends of both the long leg 32 and the short leg 33 are provided with beaded rims 35 and 36, respectively, which are semicircular in their cross section and have the function of formfittingly anchoring the shape component 31 in corresponding grooves in pressure arm 9. The inner faces of legs 32 and 33 extend planar without curvature and form a contact surface with a corresponding recess in pressure arm 9.

To further secure the position, the inner face of the long leg 32 is provided with a cuboid-shaped recess 37. A set pin 38 (FIG. 3), which extends from the contact surface of the pressing blade 9, engages with the recess 37. Furthermore, a staggered bore 39, which extends diagonally across the short leg 33, and which serves as a receptacle for a screw that is anchored in pressure arm 9 to attach the shape component 31 to the pressure arm 9, can be seen. The staggered bore 39 serves as a receptacle for the screw head so that a seamless fitting of the shape component 31 to the pressure piece 29 is possible.

Figure 5:
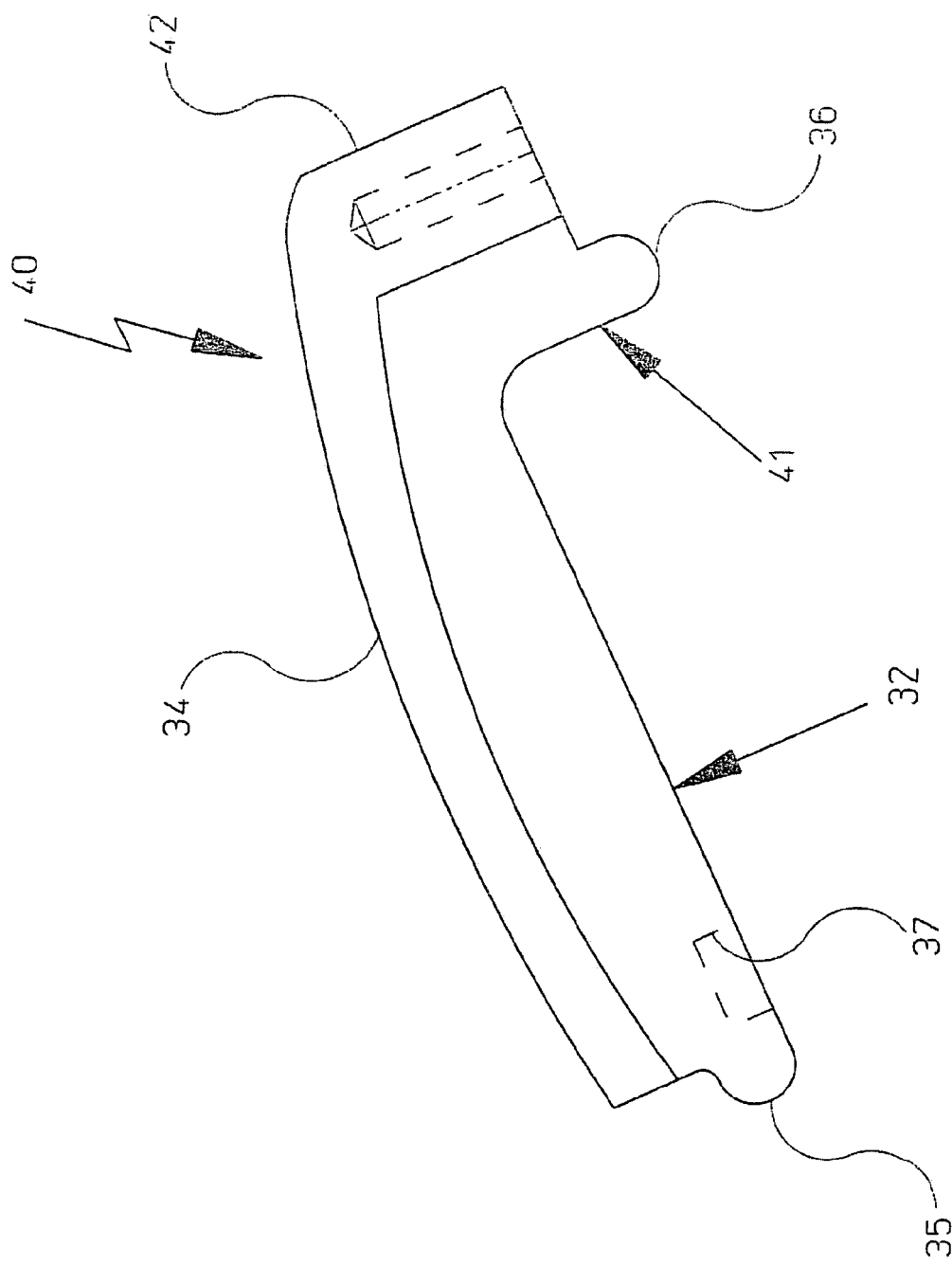

In FIG. 5, a shape component 40, which essentially equals the one illustrated in FIG. 4 and for which the same reference numerals for the same features are used, is shown in a lateral view. In contrast to the previously described shape component 31, a pressure piece 42 is molded to the shape component 40 in the area of the short leg 41. Thus, shape component 40 and pressure piece 42 are a one-piece unit and are inserted into or removed from the pressing blade 9 as one unit.

An apparatus of the present invention functions as follows: The feed material as indicated by arrow 43 is fed via the intake pipe 11 to the area of the conveyor screw 15 to be axially conveyed by its screw spirals 21 through the annular gap 20 into the compression chamber 17. There it comes into the sphere of action of pressure element 10, the pressure arms 9 of which collect the feed material and reroute it radially to the outside in the direction of the annular element 18. The feed material thereby arrives in the compression zone 30, the continuous volume reduction of which in the direction counter to the direction of rotation 27 results in ever-increasing compacting. Simultaneously, the pressing blades 9 cause an intensive blending of the feed material. The shear and friction forces resulting therefrom cause an intensive heating-up of the feed material, thus softening it. The lowered viscosity associated therewith overcomes, at constant pressure, the flow and adhesive resistance in the passage openings 19 so that the plasticized feed material terminates through the ring element 18. The feed material terminating from the exterior side of the annular element 18 is separated by rotating knives 22 into uniform, homogeneous, and supercompacted granulate material.

By using an exchangeable shape component 31, 40, the geometry of the compression zone 30, and thus the parameters of the balanced state, can be considerably influenced. Increased curvatures of the spine 34 of the shape component 31, 40, result in the triangular shape of the compression zone 30 to be more pointed. In this embodiment, the compression zone 30 has a lower volume, and the pressure on the feed material exerted by the flank 28 has a nearly axis-parallel orientation to the passage openings 19 of the ring element 18. Consequently, operating an apparatus of the present invention results in lower temperatures in the compression chamber 17, and/or the compression zone 30 at a comparatively higher pressure build-up.

In contrast thereto, when using shape components 31, 40, with a flatter curvature of the spine 34, a pronounced tapering of the compression zone 30 in the direction of the pressure piece 29 occurs, resulting in lower pressures and higher temperatures.

By selecting a suitably formed shape component 31, 40, an adjustment and optimization of an apparatus of the present invention to external circumstances, for example, type of feed material as well as shape and properties of the desired end product can be made.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An apparatus for converting feed material by pressurization, the apparatus comprising:
   a cylindrical compression chamber arranged about an axis, the cylindrical compression chamber being confined on a peripheral side thereof by an annular element having at least one passage opening; and
   a pressure element rotating in the compression chamber around the axis in a direction of rotation,
   wherein the feed material is axially fed into the compression chamber and is conveyed radially to the annular element by the pressure element,
   wherein the pressure element includes at least one pressure arm that extends to and interacts with a ring element, a front face of the pressure element, in a rotational direction of the pressure arm, is curved such that a narrowing compression zone is formed between the pressure arm and the ring element, an end of the front face being formed by a pressure piece, and wherein a segment of the pressure arm, which is located in front of the pressure piece in the direction of rotation, and which forms the compression zone, is at least in part formed by a shape component that is detachably connected to the pressure arm, a spine of the shape component determining a contour of the compression zone.

2. The apparatus according to claim 1, wherein the shape component is connected flush with the pressure arm and/or the pressure piece.

3. The apparatus according to claim 1, wherein the shape component is angle-shaped by forming a long leg and a short leg.

4. The apparatus according to claim 1, wherein the pressure arm and shape component are form-locking connected with one another.

5. The apparatus according to claim 1, wherein, at a front face in the direction of rotation, the shape component has a beaded rim, which interacts with a groove in the pressure arm to absorb radial lifting forces.

6. The apparatus according to claim 5, wherein the beaded rim or the groove is substantially arranged tangentially to the axis of rotation.

7. The apparatus according to claim 1, wherein, at a back end in the direction of rotation, the shape component has a beaded rim, which interacts with a groove in the pressure arm to absorb tangential forces.

8. The apparatus according to claim 7, wherein the beaded rim or the groove is substantially arranged radially to or in parallel to the axis of rotation.

9. The apparatus according to claim 1, wherein, in a contact surface between the pressure arm and the shape component, safeguards are arranged to prevent an axial relative movement between the pressure arm and the shape components.

10. The apparatus according to claim 9, wherein the safeguards include a longitudinal groove and a set pin engaging therein.

11. The apparatus according to claim 9, wherein a fastening device or a screw extends from the contact surface with the pressure piece through the shape component into the pressure arm.

12. The apparatus according to claim 1, wherein the shape component is friction-locked and detachably connected to the pressure piece outside of the pressure arm.

13. The apparatus according to claim 1, wherein the shape component and the pressure piece are a one-piece unit.

14. The apparatus according to claim 1, wherein the shape component is made of a wear-resistant material, preferably of hardenable tool or knife steel.

15. A shape component of an apparatus for converting feed material by pressurization, wherein the apparatus comprises:
a cylindrical compression chamber arranged about an axis, the cylindrical compression chamber being confined on a peripheral side thereof by an annular element having at least one passage opening; and
a pressure element rotating in the compression chamber around the axis in a direction of rotation,
wherein the feed material is axially fed into the compression chamber and is conveyed radially to the annular element by the pressure element,
wherein the pressure element includes at least one pressure arm that extends to and interacts with a ring element, a front face of the pressure element, in a rotational direction of the pressure arm, is curved such that a narrowing compression zone is formed between the pressure arm and the ring element, an end of the front face being formed by a pressure piece,
wherein the shape component forms a segment of the pressure arm, which is located in front of the pressure piece in the direction of rotation, and which forms the compression zone,
wherein the shape component is detachably connected to the pressure arm,
wherein a spine of the shape component determines a contour of the compression zone, and
wherein the spine of the shape component is continuously curved for forming the compression zone.

16. The shape component according to claim 15, wherein the shape component is angle-shaped by forming a long leg and a short leg.

17. The shape component according to claim 15, wherein, at one end, the shape component is provided with a beaded rim, which is oriented in a direction of a longitudinal extension of the shape component.

18. The shape component according to claim 15, wherein, at its opposite end, the shape component is provided with a beaded rim, which is oriented in a direction of a transverse extension of the shape component.

19. The shape component according to claim 15, wherein the shape component is made of a wear-resistant material.

20. The shape component according to claim 15, wherein the pressure piece is molded to the shape component to form one unit.

21. The apparatus according to claim 1, wherein the feed material is a free-flowing feed material, foils, fibers, foam materials, or powders of organic and/or inorganic materials and is converted into granules, agglomerates, pellets, or compacts.

22. An apparatus for converting feed material by pressurization, the apparatus comprising:
a cylindrical compression chamber arranged about an axis, the cylindrical compression chamber being confined on a peripheral side thereof by an annular element having at least one passage opening; and
a pressure element rotating in the compression chamber around the axis in a direction of rotation,
wherein the feed material is axially fed into the compression chamber and is conveyed radially to the annular element by the pressure element,
wherein the pressure element includes at least one pressure arm that extends to and interacts with a ring element, a front face of the pressure element, in a rotational direction of the pressure arm, is curved such that a narrowing compression zone is formed between the pressure arm and the ring element, an end of the front face being formed by a pressure piece,
wherein a segment of the pressure arm, which is located in front of the pressure piece in the direction of rotation, and which forms the compression zone, is at least in part formed by a shape component that is detachably connected to the pressure arm, a spine of the shape component determining a contour of the compression zone, and
wherein the shape component is angle-shaped by forming a long leg and a short leg, and each of the legs have a beaded rim.

* * * * *